(12) United States Patent
Gill et al.

(10) Patent No.: US 9,690,578 B2
(45) Date of Patent: Jun. 27, 2017

(54) HIGH DOSE RADIATION DETECTOR

(71) Applicant: Intel Corporation, Santa Clara, CA (US)

(72) Inventors: Balkaran Singh Gill, Cornelius, OR (US); Norbert R. Seifert, Beaverton, OR (US); Jose A. Maiz, Portland, OR (US); Xiaofeng Yang, Portland, OR (US); Avner Kornfeld, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 13/772,260

(22) Filed: Feb. 20, 2013

(65) Prior Publication Data

US 2014/0237213 A1 Aug. 21, 2014

(51) Int. Cl.
*G01T 1/24* (2006.01)
*G06F 9/22* (2006.01)
*G06F 11/30* (2006.01)
*G01T 1/02* (2006.01)
*G06F 11/18* (2006.01)

(52) U.S. Cl.
CPC ............ *G06F 9/22* (2013.01); *G06F 11/3024* (2013.01); *G01T 1/026* (2013.01); *G06F 11/183* (2013.01); *G06F 11/3006* (2013.01); *G06F 11/3058* (2013.01); *G06F 11/3093* (2013.01)

(58) Field of Classification Search
CPC .................................. G06F 9/22; G06F 11/00
See application file for complete search history.

(56) References Cited

U.S. PATENT DOCUMENTS

| | | | | |
|---|---|---|---|---|
| 4,405,871 A | * | 9/1983 | Buurma et al. | 327/143 |
| 5,010,321 A | * | 4/1991 | Larner et al. | 340/600 |
| 5,753,920 A | * | 5/1998 | Buehler et al. | 250/370.06 |
| 6,275,747 B1 | * | 8/2001 | Wada | G06F 11/00 250/339.11 |
| 8,185,812 B2 | | 5/2012 | Das et al. | |

(Continued)

FOREIGN PATENT DOCUMENTS

| CN | 1328701 A | 12/2001 |
|---|---|---|
| CN | 101512660 A | 8/2009 |

(Continued)

OTHER PUBLICATIONS

English Translation of Office Action from Corresponding Japanese Patent Application No. 2014-028369, mailed Jan. 6, 2015, 2 pages.

(Continued)

*Primary Examiner* — David Porta
*Assistant Examiner* — Shun Lee
(74) *Attorney, Agent, or Firm* — Blakely, Sokoloff, Taylor & Zafman LLP

(57) ABSTRACT

Described is a processor comprising: a plurality of radiation detectors; a first logic unit to receive outputs from the plurality of radiation detectors, the logic unit to generate an output according to the received outputs, the output of the first logic unit indicating whether the processor was exposed to incoming radiations; and a second logic unit to receive the output from the first logic unit, and to cause the processor to perform an action according to the output from the first logic unit.

8 Claims, 8 Drawing Sheets

(56) References Cited

U.S. PATENT DOCUMENTS

| | | | |
|---|---|---|---|
| 2004/0101101 A1* | 5/2004 | Hirai | G01T 1/2018 378/98.8 |
| 2005/0067587 A1* | 3/2005 | Laackmann | 250/492.1 |
| 2007/0156370 A1* | 7/2007 | White et al. | 702/132 |
| 2009/0189082 A1 | 7/2009 | Stahmann et al. | |
| 2011/0166449 A1 | 7/2011 | Stahmann et al. | |
| 2011/0275356 A1 | 11/2011 | Best et al. | |
| 2012/0138774 A1* | 6/2012 | Kelly et al. | 250/208.1 |

FOREIGN PATENT DOCUMENTS

| | | | |
|---|---|---|---|
| CN | 101689856 A | | 3/2010 |
| CN | 101907662 B | | 4/2012 |
| CN | 102636442 A | | 8/2012 |
| JP | 6-268504 A | | 3/1993 |
| JP | 2001-25071 A | | 1/2001 |
| JP | 2005-149438 A | | 6/2005 |
| JP | 2006-77409 A | | 3/2006 |
| JP | 2007-93982 A | | 4/2007 |
| JP | 2009-523498 A | | 6/2009 |
| KR | 1020070024603 | | 3/2007 |
| TW | 258342 | | 9/1995 |
| WO | WO 2007/082128 A2 | | 7/2007 |

OTHER PUBLICATIONS

Taiwan Office Action and Search Report (with English translation), dated Jun. 2, 2015, for counterpart Taiwan Application No. 103104064, (12 pages).

Notice of Allowance for Chinese Patent Application No. 201410186459.6, issued Feb. 14, 2017, 10 pages.

* cited by examiner

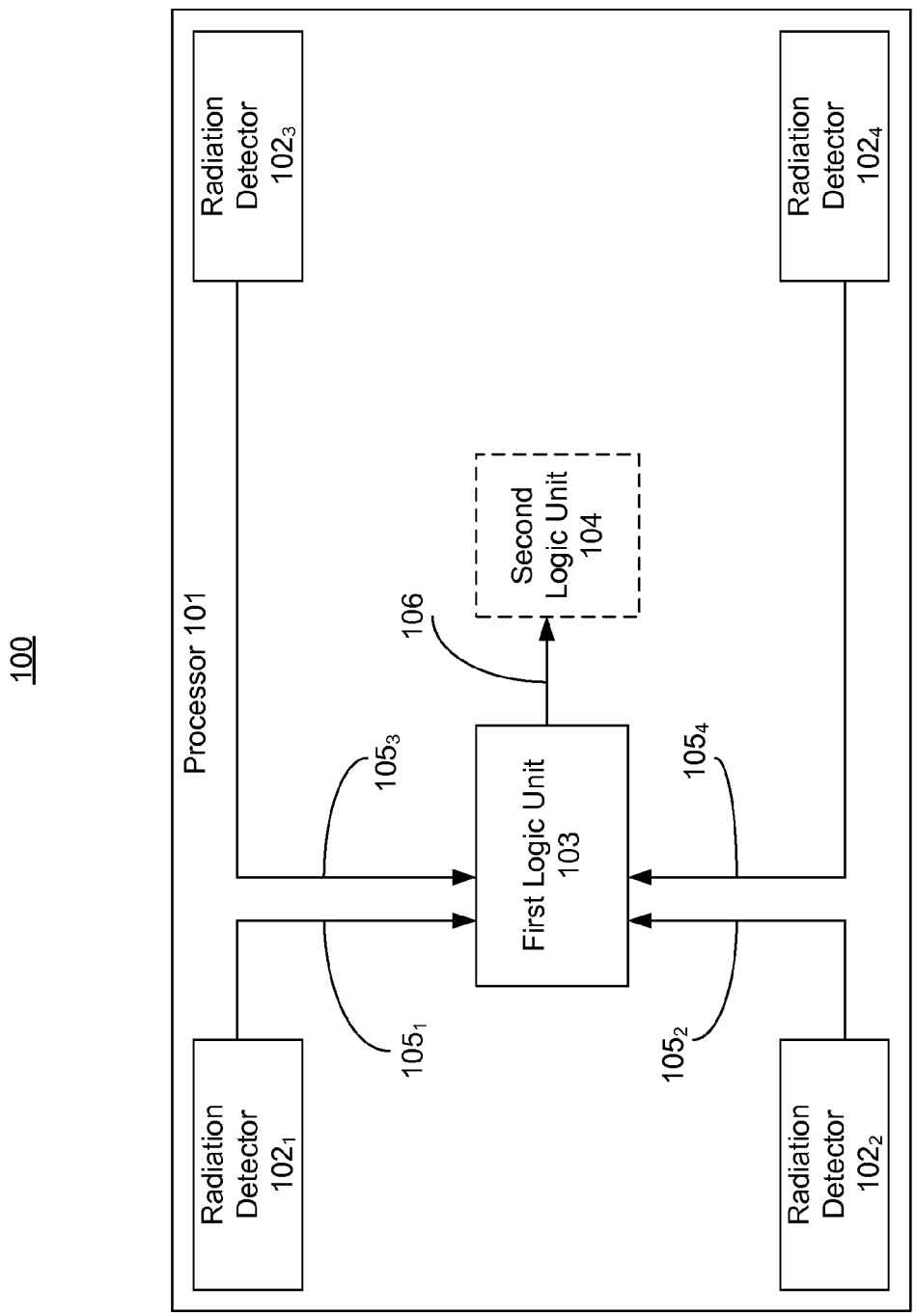

HIGH DOSE RADIATION DETECTOR

BACKGROUND

A single charged particle received by an integrated circuit (IC) can knock thousands of electrons loose, causing electronic noise and signal spikes. For example, in the case of digital circuits, electronic noise and signal spikes can cause registers to capture incorrect data. Radiation hardness of commercial integrated circuits is increasing as technology scales.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1 is a high level architecture of radiation detection, according to one embodiment of the disclosure.

DETAILED DESCRIPTION

Figure 2A:
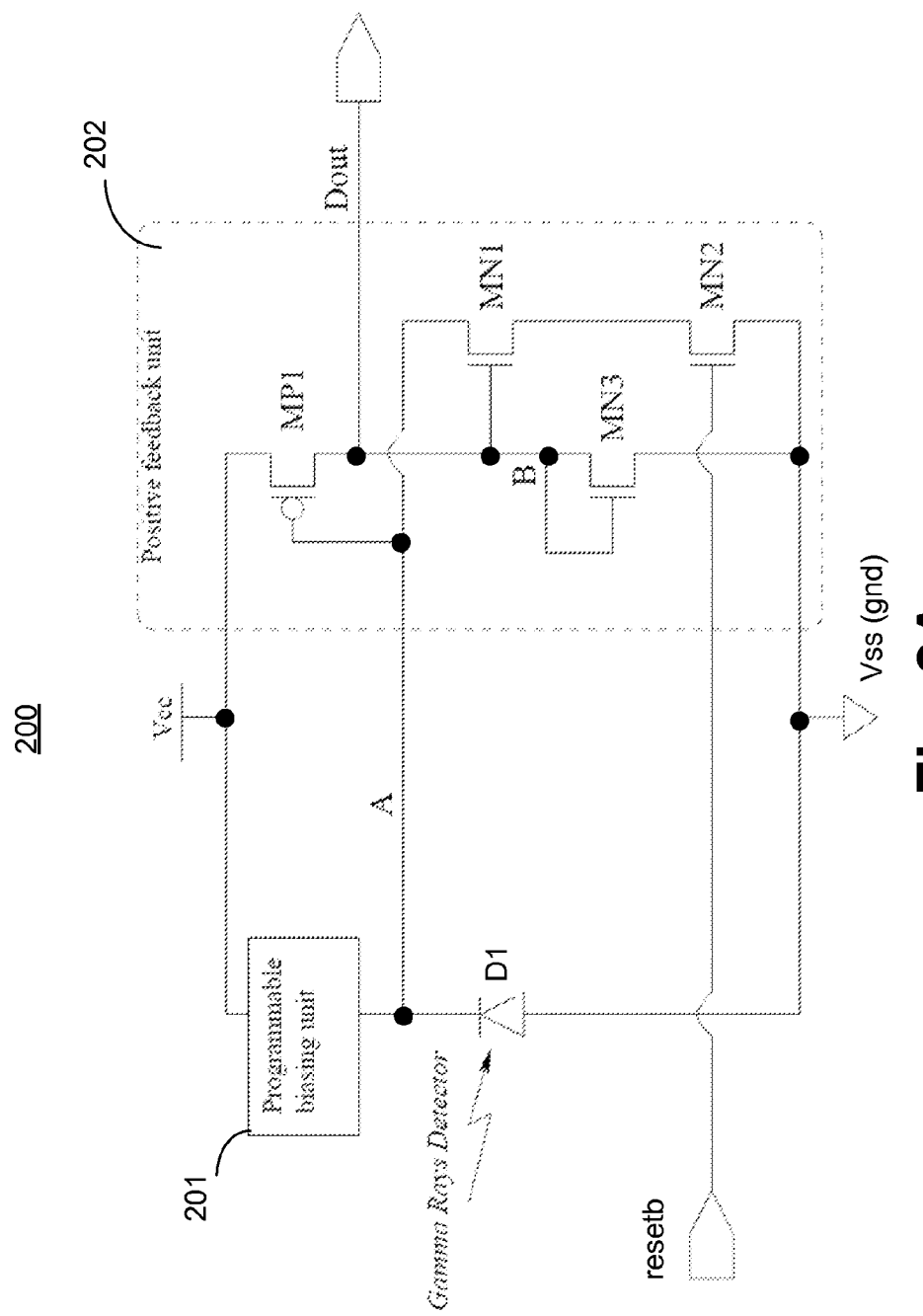
FIG. 2A is a programmable radiation detector, according to one embodiment of the disclosure.

The embodiments describe a cost effective and robust high dose rate radiation detector circuit and architecture with improved signal to noise ratio. The term "high dose rate" generally refers to an amount of high energy radiation deposited on a device within a particular time window. For example, $5 \times 10^8$ Rad/sec and higher are high dose rates.

In one embodiment, a processor includes radiation detection architecture which comprises a plurality of radiation detectors coupled to a logic unit (also referred to as the first logic unit) that receives outputs from the plurality of radiation detectors to determine whether a real high dose rate radiation was received by the processor, or whether the received radiation is a single event upset (SEU) caused by cosmic radiation. In one embodiment, the radiation detectors filter out SEUs.

In one embodiment, the first logic unit behaves like a voting unit that makes a decision about whether a real high dose rate radiation was received based on the outputs of a majority of the plurality of radiation detectors. In one embodiment, the output of the first logic unit is received by appropriate logic (e.g., power management unit) of the processor that turns the processor off in response to the output of the first logic unit. In one embodiment, the output of the first logic unit is received by an operating system that may cause the processor to take an action in response to the output of the first logic unit. For example, the operating system may force or request the processor to turn itself off, discard memory contents after the radiation was detected, repeat the last processor instruction to ascertain proper execution results, etc.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The terms "substantially," "close," "approximately," "near," "about," etc., generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 is a high level architecture 100 of radiation detection, according to one embodiment of the disclosure. In one embodiment, architecture 100 comprises a processor 101 with a plurality of radiation detectors $102_{1-N}$, where 'N' is a positive integer greater than two, first logic unit 103, and optionally second logic unit 104. So as not to obscure the embodiments of the disclosure, 'N' is equal to 4. However, 'N' can be any number greater than two. In one embodiment, processor 101 is a multi-core processor with a plurality of processing cores on the same die of the processor 101. In one embodiment, processor 101 is a graphic processing unit (GPU). In another embodiment, processor 101 can be any integrated circuit.

In one embodiment, radiation detectors $102_{1-4}$ are positioned along the periphery of processor 101. In one embodiment, radiation detectors $102_{1-4}$ are on the same die as other logic units of processor 101. In one embodiment, radiation detectors $102_{1-4}$ are positioned near the four corners of the die of processor 101. In another embodiment, radiation detectors $102_{1-4}$ are positioned anywhere within the processor 101.

For example, radiation detectors $102_{1-4}$ are positioned in the corner of processor 101, middle of the peripheral edge of processor 101, middle region or region away from the periphery of processor 101, etc. In one embodiment, some of the radiation detectors $102_{1-4}$ are positioned near critical components of processor 101. For example, some of radiation detectors $102_{1-4}$ are placed near the execution unit and/or cache unit of processor 101 so that any radiation detected close to such units can be handled faster (i.e., actions can be taken faster) than locating all of the radiation detectors near the periphery of processor 101. In one embodiment, radiation detectors $102_{1-4}$ may be positioned anywhere in the processor 101.

In one embodiment, outputs $105_{1-4}$ of each of the respective radiation detectors $102_{1-4}$ are received by first logic unit 103. In one embodiment, outputs $105_{1-4}$ are digital signals (i.e., non-analog signal). In one embodiment, first logic unit 103 compares outputs $105_{1-4}$ and determines based on digital signal level of majority of outputs $105_{1-4}$ whether a high dose radiation was received by the processor. In one embodiment, first logic unit 103 comprises comparators that compare outputs $105_{1-4}$ to a programmable reference, the outputs of the comparators indicating whether a high dose radiation was received by any of the radiation detectors $102_{1-4}$. In one embodiment, first logic unit 103 further comprises logic (e.g., counters) to count the number of positive outputs of comparators, where positive outputs indicate number of outputs indicating a read high dose event being received by one or more of radiation detectors $102_{1-4}$. In one embodiment, first logic unit 103 further comprises a finite state machine (FSM) that determines whether output of the counters indicate a majority of radiation detectors $102_{1-4}$ have been exposed to high dose radiation. If a majority of radiation detectors $102_{1-4}$ are exposed to high dose radiation, further action is taken including turning off the processor, for example.

In one embodiment, first logic unit 103 generates an output 106 which is received by second logic unit 104. In one embodiment, second logic unit 104 is a power control unit (PCU) that controls power consumption of other logic units including multiple processing cores. In one embodiment, second logic unit 104 is an operating system (OS). In one embodiment, second logic unit 104 may directly or indirectly take action in response to detection of high dose radiation. For example, second logic unit 104 may force or request processor 101 to turn itself off, discard memory contents after radiation was detected, repeat the last processor instruction to ascertain proper execution results, etc.

FIG. 2A is a programmable radiation detector 200 (e.g., radiation detectors $102_{1-4}$), according to one embodiment of the disclosure. FIG. 2A is described with reference to FIG. 1. It is pointed out that those elements of FIG. 2A having the same reference numbers (or names) as the elements of any other figure can operate or function in any manner similar to that described, but are not limited to such.

Figure 5:
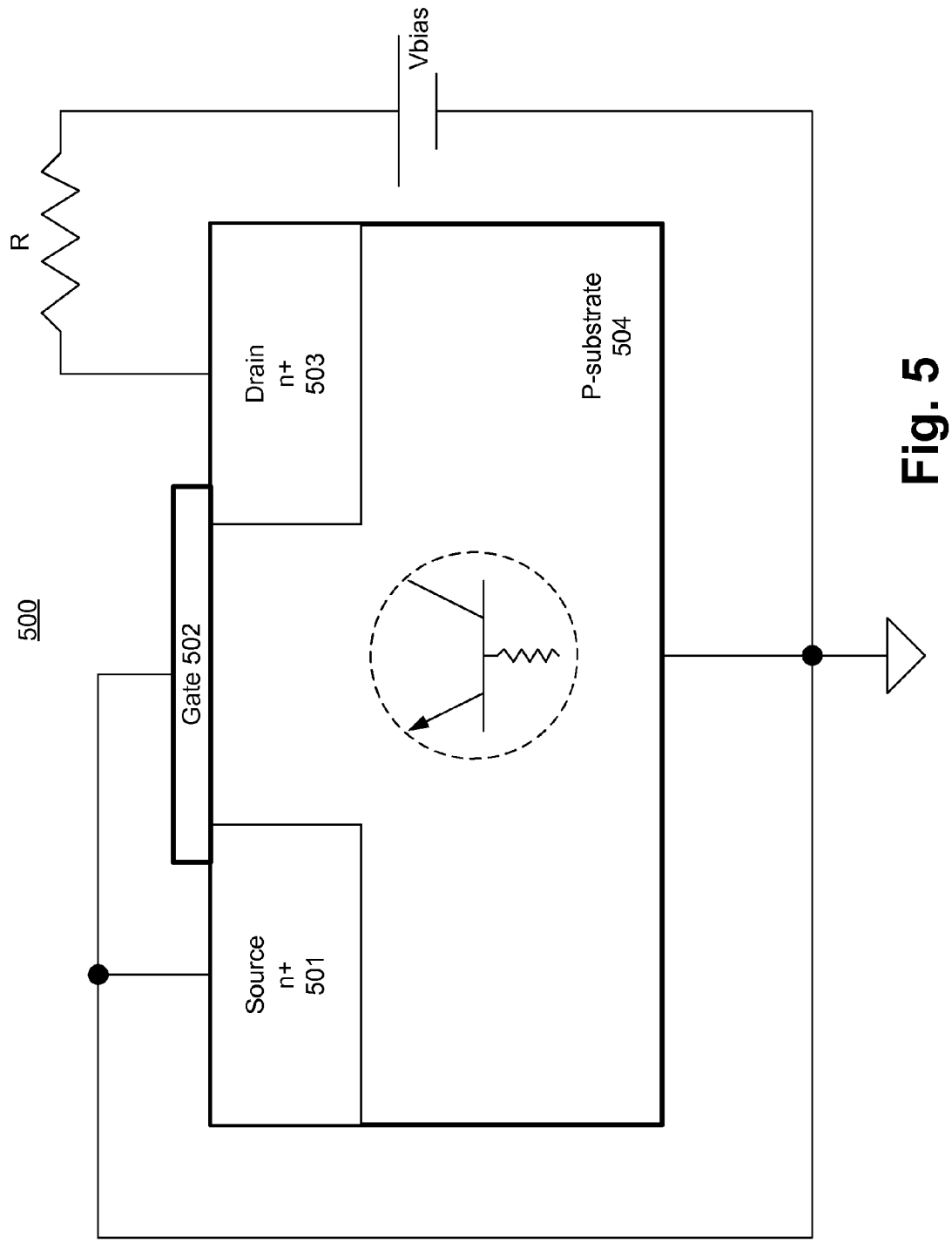
FIG. 5 is a photo-transistor design with parasitic bipolar for use as photo-current diode, according to one embodiment of the disclosure.

In one embodiment, programmable radiation detector 200 comprises programmable biasing unit 201, diode D1, and positive feedback unit 202. In one embodiment, diode D1 is reverse biased. In one embodiment, cathode (node A) of diode D1 is coupled to positive feedback unit 202. In one embodiment, diode D1 is implemented using one or more MOS transistors biased to use parasitic BJT of the MOS transistors. In other embodiments, any device that can behave as a diode can be used for diode D1. FIG. 5 illustrates one such embodiment of diode D1 in which parasitic BJT of a MOS transistor is used as a diode.

Referring back to FIG. 2A, in one embodiment, programmable biasing unit 201 is operable to achieve a balance in operation point, as the operation point (sensitivity level of diode D1) of programmable radiation detector 200 changes due to process, temperature, and voltage (PVT) variations. In one embodiment, programmable biasing unit 201 receives control signals from a fuse unit, a type of programmable read only memory, (not shown) to set the operation point of programmable radiation detector 200. In one embodiment, programmable biasing unit 201 receives control signals from other logic units including the operating system.

In one embodiment, positive feedback unit 202 comprises a p-type transistor MP1 with its gate terminal coupled to node A, source terminal coupled to Vcc (power supply), and drain terminal coupled to output node Dout (e.g., one of $105_{1-4}$). Output node Dout is also referred as node B. In one embodiment, Dout is received by first logic unit 103. In one embodiment, positive feedback unit 202 comprises a diode connected n-type transistor MN3 with its source terminal coupled to ground node (Vss). In one embodiment, positive feedback unit 202 comprises n-type transistors MN1 and MN2 coupled in series. In one embodiment, gate terminal of MN1 is coupled to node B. In one embodiment, drain terminal of MN1 is coupled to node A while the source terminal of MN1 is coupled to drain terminal of MN2. In one embodiment, gate terminal of MN2 is coupled to Resetb signal, where "Resetb" is an inverse of "Reset" signal (not shown).

In one embodiment, node A is biased to Vcc (power supply) during normal operation. Normal operation indicates an operational condition when no or substantially small high dose rate radiation is received by processor 101. During normal operation, Resetb is logical high. In one embodiment, when diode D1 receives high dose rate, photo-current is generated. This photo-current lowers the voltage level at node A which causes MP1 to conduct current. In one embodiment, when MP1 conducts current, node B is charged up causing MN1 to enter sub-threshold region to conduct current. In this embodiment, when MN1 conducts current, node A is pulled down and a positive feedback is established. In one embodiment, when node A is fully discharged by the positive feedback, a logical one is maintained at node Dout due to active positive feedback loop, until reset is applied (via Resetb signal) which disrupts the positive feedback and lets node A charge back to Vcc through the programmable biasing unit 201.

Figure 2B:
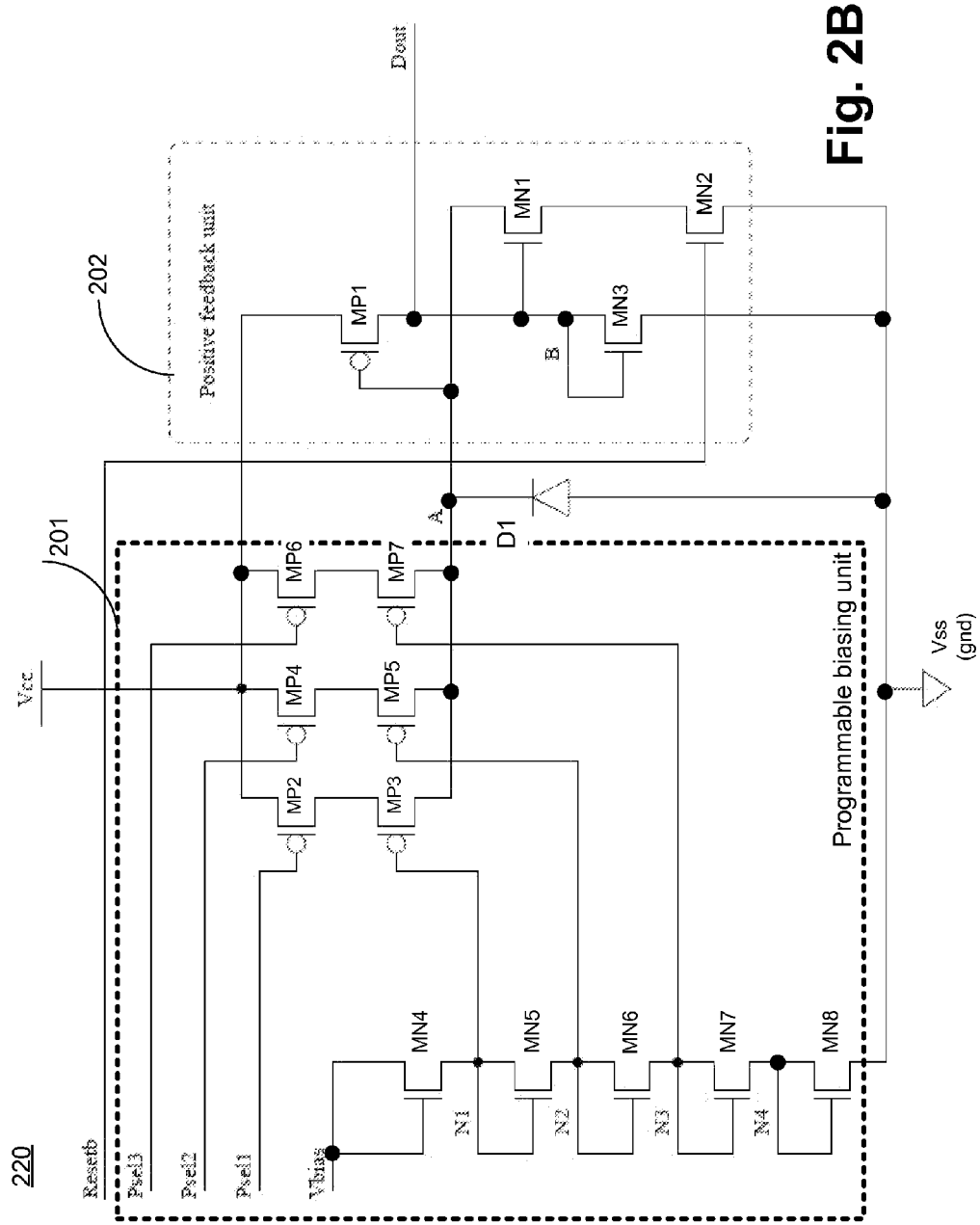
FIG. 2B is a detailed version of the programmable radiation detector of FIG. 2A, according to one embodiment of the disclosure.

FIG. 2B is a detailed view 220 the programmable radiation detector 200 (e.g., radiation detectors $102_{1-4}$), according to one embodiment of the disclosure. It is pointed out that those elements of FIG. 2B having the same reference numbers (or names) as the elements of any other figure can operate or function in any manner similar to that described, but are not limited to such. So as not to obscure the embodiment of FIG. 2B, differences between FIG. 2A and FIG. 2B are discussed.

In this embodiment, programmable biasing unit 201 comprises a plurality of devices coupled together and controllable by digital select signals to adjust voltage sensitivity of diode D1. In one embodiment, programmable biasing unit 201 comprises a voltage divider network. In one embodiment, voltage divider network of programmable biasing unit 201 comprises a plurality of p-type devices MP2-MP7 and a plurality of n-type devices MN4-MN8.

In one embodiment, stack of n-type devices MN4-MN8 divide voltage Vbias on nodes N1, N2, N3, and N4. These divided voltages provide bias voltages for MP3, MP5, and MP7. In one embodiment, MP3, MP5, and MP7 are coupled in series with MP2, MP4, and MP6 devices respectively, where MP2, MP4, and MP6 are controllable by digital select signals Psel1, Psel2, and Psel3 respectively. In one embodiment, at least one of MP2, MP4, and MP6 is turned on. To change (or program) the voltage at node A digital signals can be asserted/de-asserted. While the embodiment discloses a stack of five n-type devices, any number of n-type and corresponding p-type devices may be used to adjust the voltage of node A. In one embodiment, Vbias is Vcc/2. In other embodiments, Vbias is any other voltage between Vcc and Vss. In one embodiment, Vbias is generated by a reference generator, for example, a resistor divider, a bandgap reference generator, etc. In one embodiment, Vbias level is also programmable.

Figure 3:
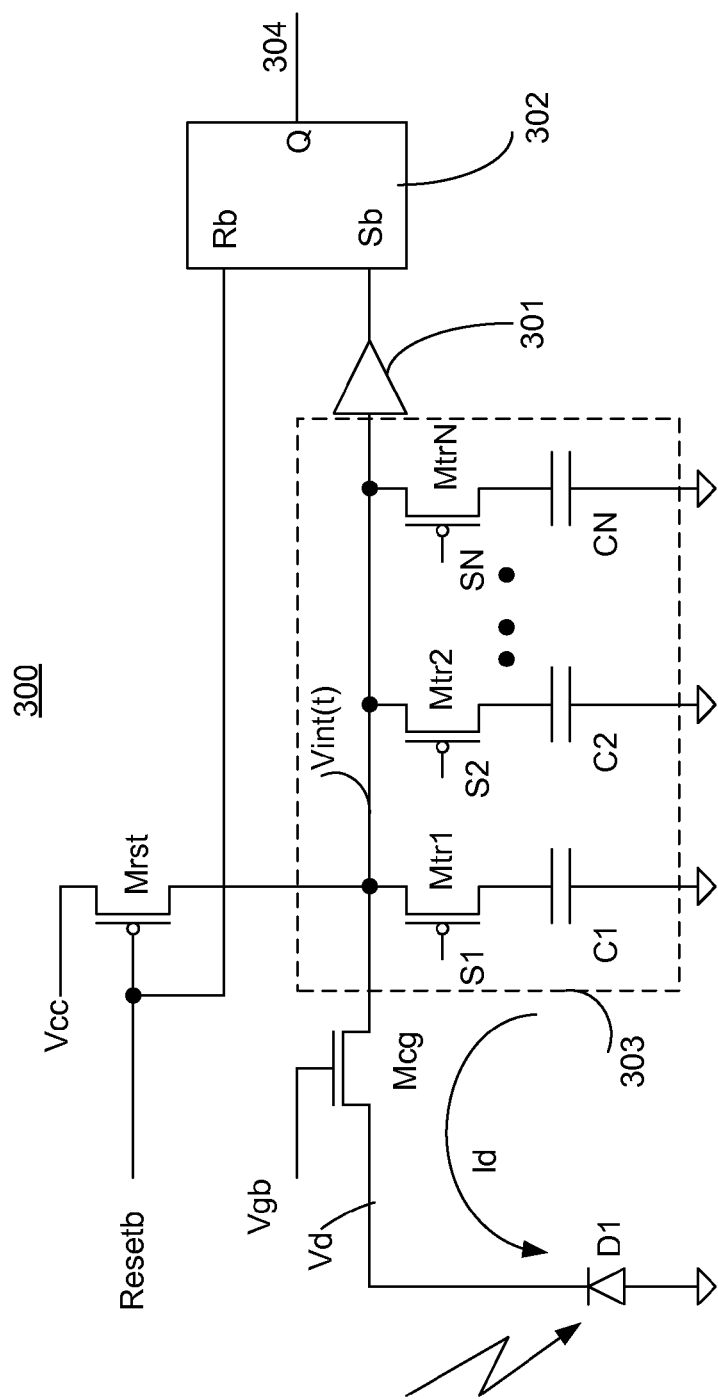
FIG. 3 is a programmable common-gate integrator based radiation detector, according to one embodiment of the disclosure.

FIG. 3 is a programmable common-gate integrator based radiation detector 300, according to one embodiment of the disclosure. FIG. 3 is described with reference to FIG. 1. It is pointed out that those elements of FIG. 3 having the same reference numbers (or names) as the elements of any other figure can operate or function in any manner similar to that described, but are not limited to such. FIG. 3 is another embodiment of radiation detector (one of $102_{1-4}$).

In one embodiment, programmable common-gate integrator based radiation detector 300 (or simply programmable CG detector) comprises diode D1, buffer 301, latch 302, n-type common gate transistor Mcg, p-type reset transistor Mrst, and one or more switch capacitors (or integrating capacitors) 303. In one embodiment, diode D1 is reverse biased or near zero biased (i.e., node Vd is near zero volts). In one embodiment, diode D1 is implemented using one or more MOS transistors biased to use parasitic BJT of the MOS transistors. In other embodiments, any device that can function as a diode can be used as diode D1. FIG. 5 illustrates one such embodiment of diode D1.

Referring back to FIG. 3, in one embodiment, one of source/drain terminals (node Vd) of common gate transistor Mcg is coupled to diode D1 while the other one of source/drain terminals (node Vint(t)) of common gate transistor Mcg is coupled buffer 301 and switch capacitors 303. In one embodiment, common gate transistor Mcg is biased by Vgb. In one embodiment, Vgb is about Vcc/2 (i.e., half of power supply). In other embodiments, other bias levels for Vgb can be used. Any suitable reference generator may be used to provide the bias for the gate terminal of common gate transistor Mcg.

In one embodiment, reset transistor Mrst is provided with its source/drain terminals coupled to Vcc and node Vint(t). In one embodiment, gate terminal of Mrst is coupled to Resetb signal, where Resetb signal is an inverse of reset signal (not shown). In one embodiment, Resetb signal is also received by latch 302. In one embodiment, latch 302 is a set-reset latch that generates a deterministic output 304 in response to Resetb or output of buffer 301. In one embodiment, latch 302 is flip-flop. In other embodiments, other suitable sequential units may be used for latch 302. In one embodiment, buffer 301 has built in hysteresis. In one embodiment, output of buffer 301 sets node 304 (same as one of $105_{1-4}$), where output of node 304 is a digital signal.

In one embodiment, switch capacitors 303 comprises one or more switch capacitors including transistor-capacitor pairs Mtr1-C1, Mtr2-C2, and MtrN-CN, where 'N' is an integer greater than two. In one embodiment, source/drain terminal of p-type Mtr1 is coupled in series to capacitor C1 which is coupled to ground, where drain/source terminal of Mtr1 is coupled to node Vint(t). In this embodiment, gate terminal of Mtr1 is controlled by S1 (or signal S1). In one embodiment, S1 is a digital signal. In one embodiment, source/drain terminal of p-type Mtr2 is coupled in series to capacitor C2 which is coupled to ground, where drain/source terminal of Mtr2 is coupled to node Vint(t). In this embodiment, gate terminal of Mtr2 is controlled by S2. In one embodiment, S2 is a digital signal different from S1. Likewise, source/drain terminal of p-type MtrN is coupled in series to capacitor CN ('N' being an integer greater than two) which is coupled to ground, where drain/source terminal of MtrN is coupled to node Vint(t). In this embodiment, gate terminal of MtrN is controlled by SN ('N' being an integer greater than two). In one embodiment, SN is a digital signal different from S1 and S2. In one embodiment, S1, S2, and SN are controllable by a fuse unit (not shown). In one embodiment, S1, S2, and SN are programmable by software (e.g., operating system).

In one embodiment, Mcg integrates photo-current and leakage current of diode D1 and converts the charge to voltage Vint(t). So as not to obscure the embodiments, node names and signals are interchangeably used. For example, node Vint(t) and signal Vint(t) are interchangeably used, where signal Vint(t) represents signal on physical node Vint(t). In one embodiment, Mrst is used to charge one or more of the activated integration capacitors—C1, C2, and/or CN—to supply voltage Vcc, where 'N' is an integer greater than two. In one embodiment, diode current Id discharges node Vint(t) until an assertion of the set-reset latch (or flip-flop) 302. In one embodiment, state change of signal 304 (e.g., change from logical low to logical high) indicates detection of a high dose radiation rate by diode D1. In one embodiment, DC (direct current) bias Vgb is used to bias diode D1 at cathode voltage Vd close to zero or at low reverse bias voltage. In one embodiment, a periodic reset operation is provided by Resetb signal pulses (inverse of reset signal pulses) to overcome assertion of output 304 due to leakage current of diode D1 integrated over a long time, and causing a false setting of latch (or flip-flop) 302.

Figure 4A:
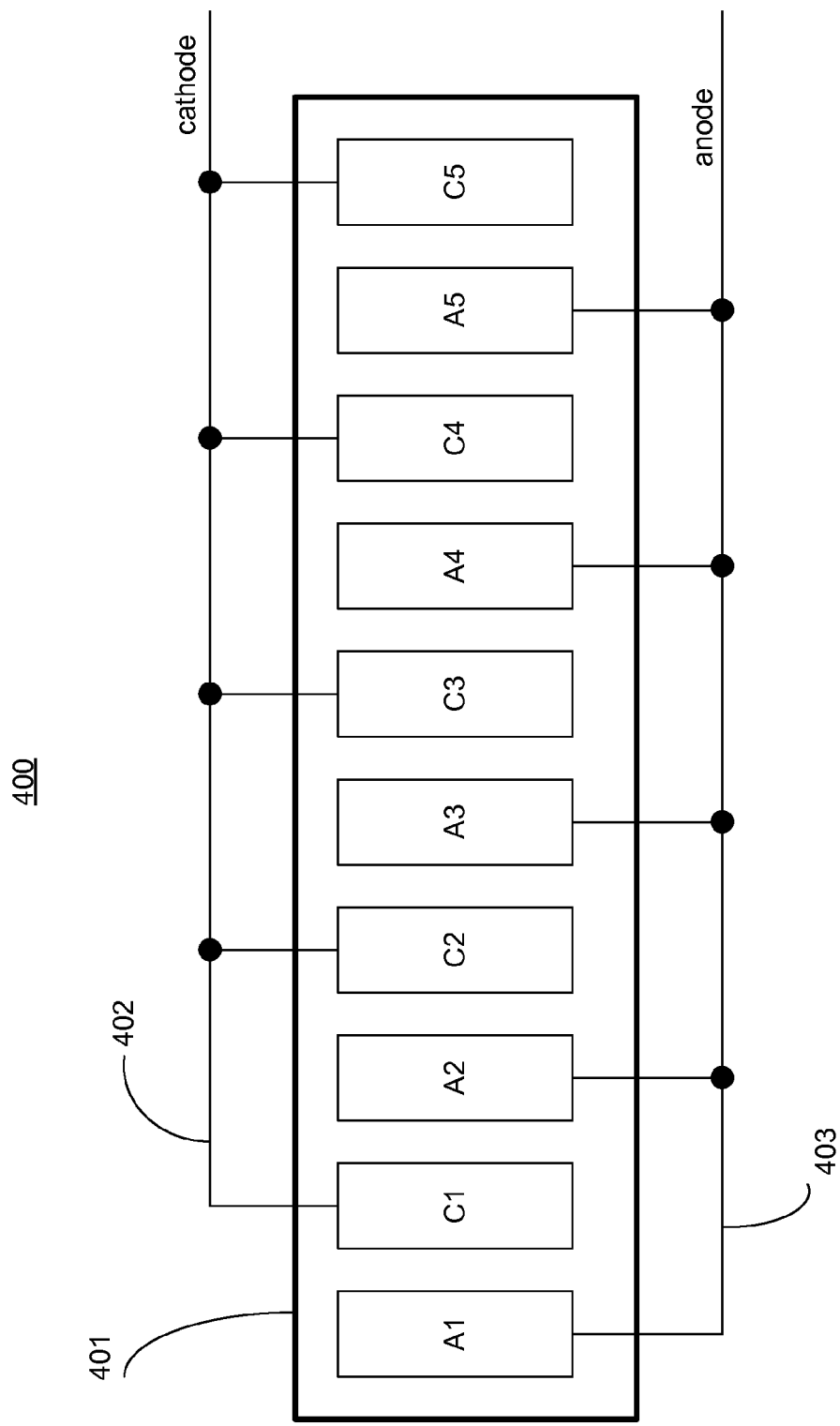
FIG. 4A is a traditional layout of a photo-current diode.

FIG. 4A is a traditional layout 400 of a photo-current diode. Traditional layout 400 comprises a substrate region 401 having a plurality of anode and cathode regions (A1,C1; A2,C2; A3,C3; A4,C4; A5,C5; etc.) evenly distributed through the substrate region 401. The cathode regions are coupled to node 402. The anode regions are coupled to node 403.

To collect sufficient charge by a photo-current diode, large diode areas are needed. However, large diode areas increase junction capacitance which limits the signal to noise ratio. To improve signal to noise ratio over traditional layout 400 and to reduce junction capacitance, an improved layout is used as shown in FIG. 4B.

Figure 4B:
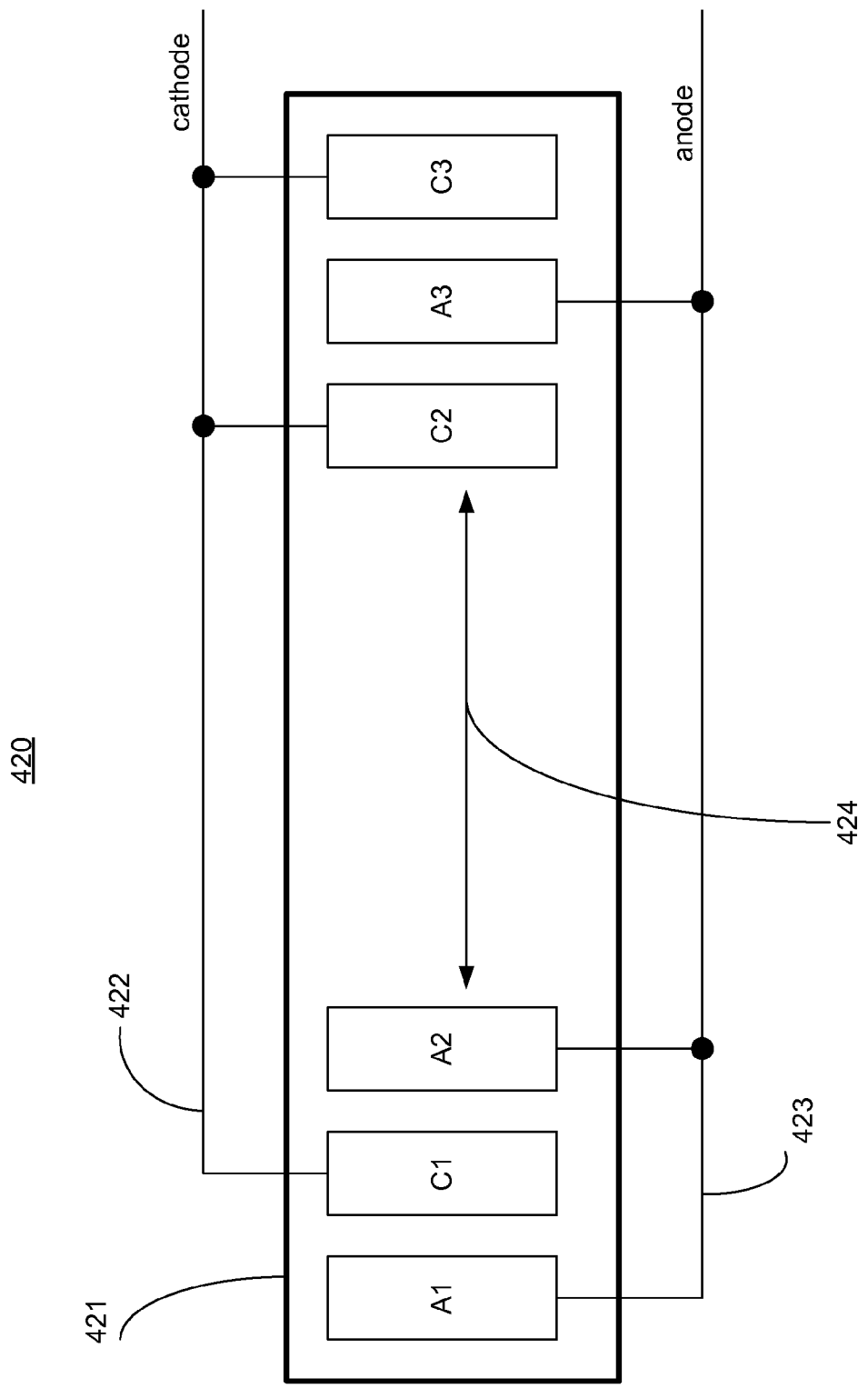
FIG. 4B is an improved layout of a photo-current diode with smaller junction area and capacitance for efficient radiation detection, according to one embodiment of the disclosure.

FIG. 4B is an improved layout 420 of a photo-current diode with smaller junction area and capacitance for efficient radiation detection, according to one embodiment of the disclosure. It is pointed out that those elements of FIG. 4B having the same reference numbers (or names) as the elements of any other figure can operate or function in any manner similar to that described, but are not limited to such. Improved layout 420 comprises fewer anode and cathode regions compared to traditional layout 400 of FIG. 4A.

In this embodiment, capacitance on cathode 422 and anode 423 is reduced because of fewer contacts with cathode and anode regions. In one embodiment, the anode and cathode regions are distributed near the ends of substrate 421 such that majority of the substrate region 424 is devoid of anode and cathode regions. By placing the anode and cathode regions (or junctions) as shown, an increase in the collected photocurrent is achieved while maintaining low capacitance. In such an embodiment, signal to noise ratio is increased and a more robust and simpler circuit design (e.g., 200 and 300) are realized.

When a particle (e.g., high dose radiation particle) strikes substrate 421, electron-hole pairs are generated in substrate 421. Charge is then collected at the diode junction via drift or diffusion. These electrons are collected by positively biased cathode regions (e.g., C1, C2, and C3). The holes are collected by anode regions (e.g., A1, A2, and A3). In one embodiment, the empty region 424 of the substrate 421 enables the diode 420 (or layout of diode 420) to efficiently collect charge over an area much larger than the diode junctions. The low capacitance enables rapid signal detection by on-die detection circuits (e.g., 200 and 300) which improves time constants and signal to noise ratio, and results in a smaller silicon footprint (silicon area of 200 and 300).

FIG. 5 is a photo-transistor design with parasitic bipolar for use as photo-current diode, according to one embodiment of the disclosure. It is pointed out that those elements of FIG. 5 having the same reference numbers (or names) as the elements of any other figure can operate or function in any manner similar to that described, but are not limited to such.

To save cost of having a separate diode device for process technology, in one embodiment, MOS transistor is biased as a photodetector diode. In one embodiment, MOS transistor 500 is biased such that the source terminal 501 is coupled to the gate terminal 502 which is coupled to ground. In this embodiment, drain terminal 503 is biased by Vbias (modeled as a battery coupled to resistor R.). In this embodiment, P-substrate 504 is coupled to ground. The embodiment of FIG. 5 increases photo-current and signal to noise ratio over non-parasitic MOS device.

In this embodiment, biasing is such that the generated electrons are swept to drain diffusion region 503 which acts as a BJT collector. The holes are transported to the substrate region 504 which acts as a BJT base. In this embodiment, substrate current forward biases the base (i.e., p-type well region of substrate region 504) relative to source terminal 501 which acts as a BJT emitter. The forward biasing of the BJT base results in an amplified drain current (i.e., amplified collector current). In this embodiment, gate terminal 502 is grounded to ensure that MOS transistor 500 is turned off and does not interfere with the operation of the parasitic BJT (same as MOS transistor 500). The embodiment of FIG. 5 as used in detectors 200 and/or 300 increases photo-current signal at reduced radiation levels which enables further reduction in the size of the detector 200 and/or 300.

Figure 6:
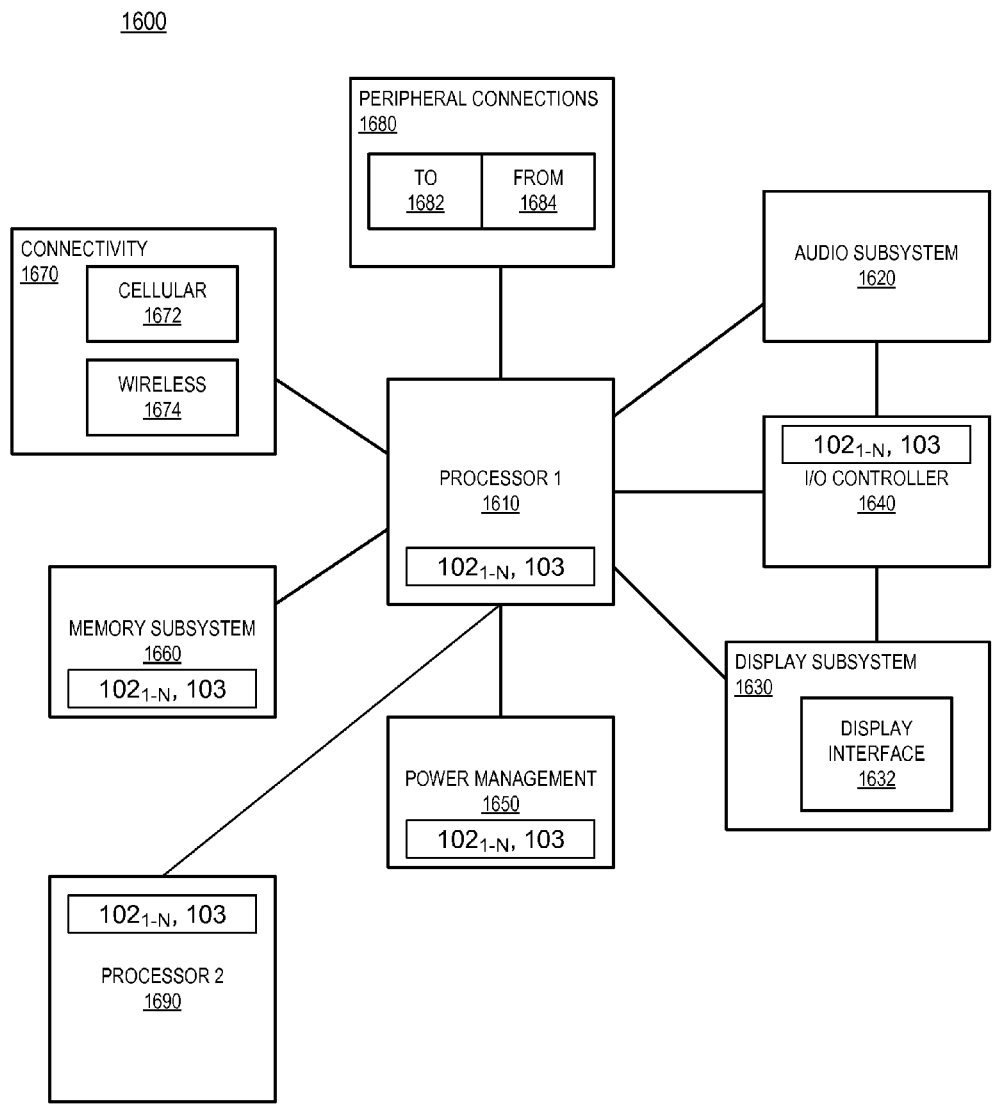
FIG. 6 is a smart device or a computer system or a SOC (system on chip) with apparatus for radiation detector, according to one embodiment of the disclosure.

FIG. 6 is a smart device or a computer system or a SOC (system on chip) with apparatus for radiation detector, according to one embodiment of the disclosure. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with radiation detectors $102_{1-N}$ (e.g., 200, 300) and other logic units (e.g., 103, 104), according to the embodiments discussed. Other blocks of the computing device 1600 may also include radiation detectors $102_{1-N}$ (e.g., 200, 300) and other logic units (e.g., 103, 104). The various embodiments of the present disclosure may also comprise a network interface within 1670 such as a wireless interface so that a system embodiment may be incorporated into a wireless device, for example, cell phone or personal digital assistant.

In one embodiment, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device 1600. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or an element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, a multi-core processor comprises: a plurality of radiation detectors; a first logic unit to receive outputs from the plurality of radiation detectors, the logic unit to generate an output according to the received outputs from the plurality of radiation, the output of the first logic unit indicating whether the multi-core processor was exposed to radiations; and a second logic unit to receive the output from the first logic unit, and to cause the multi-core processor to perform an action according to the output from the first logic unit.

In one embodiment, each of the plurality of radiation detectors comprises: a diode in reverse bias mode; and a positive feedback unit coupled to the diode. In one embodiment, the diode is implemented with a parasitic BJT of a MOS transistor. In one embodiment, the multi-core processor further comprises a biasing unit, coupled to the diode, to set radiation detection sensitivity of the diode. In one embodiment, the biasing unit is programmable to adjust the sensitivity of the diode. In one embodiment, the first logic unit to generate the output according to responses from a majority of the plurality of radiation detectors. In one embodiment, each of the plurality of radiation detectors comprises: a diode; a common gate transistor coupled at one end to the diode; a capacitor having: a first node coupled to another end of the diode; and a second node coupled to ground; and a latch to detect and store voltage of the first node. In one embodiment, the second logic unit to turn off the multi-core processor according to the output from the first logic unit.

In another example, an apparatus comprises: a plurality of radiation detectors distributed in a processor die; and a logic unit to receive outputs from the plurality of radiation detectors, the logic unit to determine according to the received outputs whether the processor die was exposed to incoming radiations. In one embodiment, each of the plurality of radiation detectors comprises: a diode in reverse bias mode; and a positive feedback unit coupled to the diode.

In one embodiment, the diode is implemented with a parasitic BJT of a MOS transistor. In one embodiment, the apparatus further comprises a biasing unit, coupled to the diode, to set radiation detection sensitivity of the diode. In one embodiment, the biasing unit is programmable to adjust the sensitivity of the diode. In one embodiment, a layout of the diode comprises electrical connections to anode and cathode regions of the diode, wherein the anode and cathode regions are separated by a substrate region devoid of any connections. In one embodiment, the separated substrate region being the majority of the substrate region of the diode.

In one embodiment, the plurality of radiation detectors is distributed at the corners of the processor die. In one embodiment, each of the plurality of radiation detectors comprises: a diode; a common gate transistor coupled at one end to the diode; a capacitor having: a first node coupled to another end of the diode; and a second node coupled to ground; and a latch to detect and store voltage of the first node. In one embodiment, the logic unit to generate an output according to responses from a majority of the plurality of radiation detectors. In one embodiment, the apparatus further comprises an operating system to receive the output of the logic unit and to take an action according to the output of the logic unit. In one embodiment, the apparatus further comprises another logic unit to receive the output of the logic unit, and to cause logic units in the processor die to take an action according to output of the logic unit.

In another example, a system comprises a memory; a multi-core processor, coupled to the memory, the multi-core processor including: a plurality of radiation detectors distributed in the multi-core processor; and a logic unit to receive outputs from the plurality of radiation detectors, the logic unit to determine an output according to the received outputs from the plurality of radiation detectors whether the multi-core processor die was exposed to incoming radiations; and a wireless interface to allow the multi-core processor to communicate with another device; and a display unit.

In one embodiment, each of the plurality of radiation detectors comprises: a diode in reverse bias mode; and a positive feedback unit coupled to the diode. In one embodiment, the diode is implemented with a parasitic BJT of a MOS transistor. In one embodiment, the system further comprises a biasing unit, coupled to the diode, to set radiation detection sensitivity of the diode. In one embodiment, the plurality of radiation detectors are distributed at corners of a die of the multi-core processor, and wherein the logic unit to generate an output according to responses from a majority of the plurality of radiation detectors.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. A multi-core processor comprising:
   a plurality of radiation detectors, at least one of the radiation detectors comprising a first plurality of anode and cathode regions at a first end of a substrate; a second plurality of the anode and cathode regions on a second end of the substrate, and a majority of the substrate between the first plurality of the anode and cathode regions and the second plurality of the anode and cathode regions that is devoid of the anode and cathode regions;
   a first logic unit to receive outputs from the plurality of radiation detectors, the first logic unit comprises counters to count a number of received outputs from the plurality of radiation detectors indicating a dose radiation is received, the first logic unit to generate an output according to an output of the counters, the output of the first logic unit indicating whether the multi-core processor was exposed to radiations; and a second logic unit to receive the output from the first logic unit, and to cause the multi-core processor to perform an action according to the output from the first logic unit.

2. The multi-core processor of claim 1 further comprising a finite state machine (FSM) to determine whether the output of the counters indicates a majority of the plurality of radiation detectors have been exposed to the dose radiation, wherein the first logic unit to generate the output according to responses from the majority of the plurality of radiation detectors.

3. The multi-core processor of claim 1, wherein the second logic unit is to turn off the multi-core processor according to the output from the first logic unit.

4. The multi-core processor of claim 1, wherein the output of the first logic unit indicates the multi-core processor was exposed to radiations when at least two of the plurality of radiation detectors indicate the dose radiation has been received.

5. An apparatus comprising:
a plurality of radiation detectors distributed in a processor die, at least one of the radiation detectors comprising a first plurality of anode and cathode regions at a first end of a substrate; a second plurality of the anode and cathode regions at a second end of the substrate, and a majority of the substrate between the first plurality of the anode and cathode regions and the second plurality of the anode and cathode regions that is devoid of the anode and cathode regions; and a logic unit to receive outputs from the plurality of radiation detectors, the logic unit comprises counters to count a number of received outputs from the plurality of radiation detectors indicating a dose radiation is received, and the logic unit to determine according to an output of the counters whether the processor die was exposed to incoming radiations.

6. The apparatus of claim 5, wherein the plurality of radiation detectors is distributed at the corners of the processor die.

7. The apparatus of claim 5 further comprising:
a finite state machine (FSM) to determine whether the output of the counters indicates a majority of the plurality of radiation detectors have been exposed to the dose radiation, wherein the logic unit to generate an output according to responses from the majority of the plurality of radiation detectors.

8. A system comprising:
a memory;
a multi-core processor, coupled to the memory, the multi-core processor including:
a plurality of radiation detectors distributed in the multi-core processor, at least one of the radiation detectors comprising a first plurality of anode and cathode regions at a first end of a substrate; a second plurality of the anode and cathode regions at a second end of the substrate, and a majority of the substrate between the first plurality of the anode and cathode regions and the second plurality of the anode and cathode regions that is devoid of the anode and cathode regions; and a logic unit to receive outputs from the plurality of radiation detectors, the logic unit comprises counters to count a number of received outputs from the plurality of radiation detectors indicating a dose radiation is received, and the logic unit to determine an output according to an output of the counters whether the multi-core processor was exposed to incoming radiations; and a wireless interface to allow the multi-core processor to communicate with another device; and a display unit.

* * * * *